United States Patent Office 3,367,996
Patented Feb. 6, 1968

3,367,996
PHOSPHORUS-CONTAINING POLYMERS
Richard Strauss, Lexington, and James Bottomley, Tewksbury, Mass., assignors to National Polychemicals, Inc., Wilmington, Mass., a corporation of Massachusetts
No Drawing. Continuation-in-part of applications Ser. No. 377,110, June 22, 1964, and Ser. No. 441,369, Mar. 19, 1965. This application June 8, 1965, Ser. No. 462,385
23 Claims. (Cl. 260—887)

ABSTRACT OF THE DISCLOSURE

Phosphorus-containing polymers useful as stabilizers in a variety of compositions are prepared by the reaction of a phenolic compound, an aldehyde capable of condensing with the phenol, and a trivalent phosphorus compound. In one embodiment, a phosphite polymer is prepared by a reacting phenyl phosphite such as trisnonyl phenyl phosphite with an aldehydic compound like formaldehyde. In another embodiment, an ester polymer is prepared by reacting a trivalent phosphite compound with a thermoplastic resinous novolak such as for example, the reaction of phosphorus trichloride or organic phosphite with a phenol-formaldehyde novolak resin. These phosphorus-containing polymers are useful stabilizers in synthetic elastomers like styrene butadiene rubber and thermoplastic resins like polypropylene.

---

The present invention is concerned with phosphorus-containing polymers, their preparation and their use as stabilizers.

It has been found that the phosphorus-containing polymer as hereinafter described are of considerable utility inter alia as stabilizers for plastics. This application is a continuation in part of our copending applications S.N. 377,110, filed June 22, 1964 and S.N. 441,369, filed Mar. 19, 1965 both now abandoned.

Accordingly the present invention is for the phosphorus-containing polymers prepared by the reaction of a phenol, an aldehyde and a trivalent phosphorus compound.

According to one embodiment the invention is for the phosphorus-containing polymer prepared by the reaction of a phenol and an aldehyde to form a thermoplastic polymer which is then reacted with a trivalent phosphorus compound; these polymers are hereinafter referred to as ester polymers.

According to another embodiment the invention is for the phosphorus-containing polymers prepared by the reaction of an aromatic phosphite, which may be prepared by the reaction of a phenol and a trivalent phosphorus compound, with an aldehyde to form the polymer; these polymers are hereinafter referred to as phosphite polymers.

The phosphorus-containing polymers may be characterized by a conventional resinous condensation formula when one or more of the hydrogens of the hydroxyl radical of the phenolic groups are replaced by a bond to the phosphorus atom. Where stoichiometric quantities of a trivalent phosphorus compound are used all or substantially all of the hydroxyl radicals will be reacted.

A typical phosphorus-containing polymer made under acidic conditions, will have ortho rather than para condensation. The phenolic groups of the resin may be unsubstituted or substituted with hydrocarbon radicals such as an aliphatic, alicyclic, alkyl, alkylene, aryl, or mixed alkylaryl or other organic radicals with $C_4$–$C_{12}$ alkyl radicals preferred. The amount of phosphorus may vary with a stoichiometric amount of phosphorus being one atom for each three phenolic radicals. Where less phosphorus is employed, the condensation product may have free hydroxyl groups.

The phosphorus-containing polymers may range from viscous liquid to solids, depending upon the nature of the reactants and the conditions of the reaction. The phosphorus-containing polymers have utility as stabilizers and as components in stabilizer and antioxidant systems in plastics, resins and elastomers. The phosphorus-containing polymers are particularly useful as heat and processing stabilizers in hydrocarbon resins and conjugate diene elastomers subject to colour and thermal degradation such as polyolefins, like polypropylene resins and styrene-butadiene rubber (hereinafter referred to as SBR).

The ester polymers and the phosphite polymers although empirically the same possess somewhat different properties as regards resistance to hydrolysis, volatility, viscosity, colour development and the like. For convenience the preparation of the ester polymers and the phosphite polymers is described separately below.

In the preparation of the ester polymers, the phenol may be phenol, an alkyl substituted phenol or an alkylene bisalkyl phenol; the aldehyde is suitably formaldehyde. The common preparation of a phenol-formaldehyde thermoplastic resin or novolak comprises the reaction of a phenol or an alkylated phenol such as a para alkylated phenol with formaldehyde in the presence of an acid or basic catalyst. The formaldehyde is employed in a mol ratio of less than 1 mol of formaldehyde per mol of phenol; e.g., from about 0.10 to 0.95 mol of formaldehyde or less than a stoichiometric amount. The acid catalyzed reaction is usually carried out in a one-step reaction at a pH of less than about 1.5 and results in a thermoplastic resinous condensation product which is characterized by being soluble in certain organic solvents, such as alcohol, but not significantly soluble in water or hydrocarbons. These acid catalyzed fusible thermoplastic resins are commonly referred to as novolaks. Thermoplastic novolaks may also be prepared by reacting in two separate stages at higher acid pH values to produce a novolak which is mainly linked through the ortho rather than the para positions of the phenol rings. Alkylated $C_4$–$C_{18}$ phenols, e.g. $C_4$–$C_9$ having para alkyl groups have been particularly useful in preparing ester polymers useful as stabilizers. After the preparation of the thermoplastic phenolic resin the acid catalyzed product is usually distilled to remove water and low molecular weight products, and may then be neutralized by the addition of an alkaline salt such as sodium carbonate.

The condensation reaction product of the phenolic resinous novolak is then reacted with the trivalent phosphorus compound which is suitably phosphorus trichloride, in bulk or in an organic solvent like an alcohol such as methanol, isopropanol, ethanol or a hydrocarbon such as an aromatic hydrocarbon like benzene, toluene, and xylene or mixtures thereof usually at a temperature of between 40° to 85° C. A stoichiometric amount of phosphorus trichloride (i.e. 1 mol of $PCl_3$ to 3 mols of phenol) may be used to react with the free hydroxy groups of the phenol ring, where a product approaching maximum phosphorus theoretical content is desired, e.g. about 3 to 8 weight percent. Typical ester polymers may be prepared by reacting one mol of phenol or alkylated phenol (i.e. the phenol content of the novolak resin) with about 0.05 to 0.33 mol of phosphorus trichloride. Where less than a stoichiometric amount of $PCl_3$ is used, the resulting product will be a partial ester polymer having free hydroxy groups. The ester polymers with free hydroxyl groups are useful where this is to be an intermediate product or when a stabilizer with anti-oxidant properties is desired. Phenolic components such as alklated phenols like alkylene bisalkylated phenol such as methylene bisbutylated cresol provide ester polymers with stabilizer and antioxidant properties. The ester polymers have the hydrogen of the hydroxyl groups replaced with a direct bond from the oxygen to the phosphorus atom.

The phosphite polymers may be prepared from phosphites having a wide range of substituent groups, but it is an essential requirement that the aromatic phosphite contain an aryl radical which is unsubstituted in the 2, 4 or 6 position in order to react with the aldehyde. Phosphites found particularly useful are those materials containing at least one phenyl or alkl-substituted phenyl radical such as where the phenyl radical is linked directly through oxygen to the phosphorus atom. The phosphite polymers may be prepared from phosphites including diphosphites and polyphosphites which include one, two, three, or more hydrocarbon radicals such as aliphatic, aromatic, alicyclic and mixed organic radicals. Phosphites particularly useful in preparing stabilizers include trihydrocarbon phosphites such as those phosphites containing alkyl, alkylene, phenyl, and alkylene and alkyl-substituted phenyl radicals. Specific phosphites include but are not limited to: triphenyl phosphite, trisnonylphenyl phosphite, triestertiarybutylphenyl phosphite, tribenzyl phosphite, diphenylorthocresyl phosphite, tris 2, 6-xylenol phosphite, trisparacresyl phosphite, tris 2, 6-tertiary butylphenyl phosphite, trisoctylphenyl phosphite, trisdodecylphenyl phosphite, mono and bisnonyl phenyl phosphite, bisnonyl-phenyl isodecyl phosphite, tertiary-butylbisphenyl phosphite, bisphenylnonylphenyl phosphite, bisphenylnaphthyl phosphite and bisnonylphenylnapthyl phosphite and the like.

The phosphite is reacted with aliphatic and alicyclic aldehydes or materials which under the reaction conditions employed release a suitable aldehyde. Typical aldehydes include: formaldehyde, both in aqueous and anhydrous solvent solution, paraformaldehyde, acetaldehyde, glyoxal, furfural and the like. Hexamethylenetetraamine or metal formates like calcium formate which on heating generate reactive methylene radicals may also be employed. Formaldehyde and hexamethylenetetraamine have been found to be particularly effective aldehydes.

The mol ratio of the phenol or its equivalent, i.e. the phenol content of the phosphite to the formaldehyde may range for example between about 0.10 and 2.00 e.g. 0.50 and 1.50. In general varying the ratio of phenol to formaldehyde varies the melting or softening point of the resulting resin.

The reaction may be carried out in an acidic, basic or neutral catalyst system employing those catalysts commonly known and used for preparing phenol-formaldehyde resins. For example, in a system having a pH of about 7.0 metal salts of zinc, lead, magnesium, aluminium and the like may be used. Suitable basic catalysts comprise inorganic oxides and hydroxides like alkali hydroxides such as sodium and potassium hydroxide, tertiary amines, ammonium and quaternary ammonium hydroxides and the like. Acidic catalysts include mon-, di- and poly carboxlic acids like oxalic acid as well as inorganic acids like sulfuric acid and acidic metal salts. The catalysts are used in an amount sufficient to promote the reaction generally from about 0.1 to 2 weight percent of the reactive phenyl radicals present in the system.

Trisalkyl-substituted phenyl phosphites reacted with formaldehyde in the presence of a basic catalyst generally yield solids having a melting point of 150° and above. With an acidic catalyst the phosphite polymers range from a viscous liquid to a brittle solid. The phosphorus content of our phosphite resin polymer usually ranges from about 4 to 10 weight percent and up to 16 weight percent.

Although phosphorus halides like trichloride may be employed as the trivalent phosphorus compound, the phosphorus-containing polymers may also be prepared by transesterification reaction with organic phosphites such as with phenyl phosphites like triphenyl phosphite, tri p. t. butyl phenyl phosphite; alkyl phosphites like triethyl phosphite, trimethyl phosphite as well as dimethyl phosphonium chloride and other phosphite compounds.

The phosphorus-containing polymers according to the present invention are usually reacted in bulk or in an organic or nonaqueous solvent such as an alcohol, ester, ketone, hydrocarbons and the like to reduce hydrolysis during the reaction. For example, in preparing the phosphite polymers, the use of substantially anhydrous alcohol-formaldehyde solution such as ethanol, isopropanol, and methanol solutions are recommended. After the reaction is complete, it is often desirable to remove any excess phenol or free phenolic compounds from the phosphite polymer such as by steam stripping or other means. Steam stripped phosphite polymers have shown less tendency to develop colour when used as polymeric stabilizers.

The phosphorus-containing polymers according to the present invention aid in preventing a change in colour or mechanical strength properties during processing or storage of the polymer, plastic, elastomer, or resin into which they are incorporated. The phosphorus-containing polymers may be used alone, or in combination with and as a component of other and conventional stabilizer systems, and may be used in a wide variety of plastic requiring stabilizers such as vinyl resins like polyvinyl-chloride and vinyl-chloride - vinyl acetate copolymers, polyesters, urethanes, acrylic resins, styrene resins like polystyrene and rubber modified polystyrene, and in other polymers particularly those thermoplastic hydrocarbon resins and polymers which normally develop colour on storage or during processing at elevated temperatures. The solid phosphorus-containing polymers may be employed as the phosphite chelator with barium-cadmium and barium-zinc stabilizing systems in vinyl resins.

The phosphorus-containing polymers, according to the present invention may also be employed with natural and synthetic elastomers such as those homo and copolymer diene conjugate elastomers requiring a stabilizer additive. Such elastomers would include, but not be limited to; rubbery styrene-butadiene copolymers (SBR), as well as polymers of butadiene and acrylonitrile such as acrylonitrile-butadiene copolymers, acrylonitrile-butadiene-styrene copolymers, (ABS), polybutadiene, butyl rubber, and acrylonitrile-styrene copolymers. Other elastomers include natural rubber, carboxylated elastomers ethylene-propylene rubbery copolymers and terpolymers such as with dienes like cyclopentadiene and the like.

The phosphorus-containing polymers according to the present invention find significant utility as stabilizer additives in natural and synthetic hydrocarbon resins such as $C_2$–$C_4$ polyolefin resins like polypropylene, polyethylene, ethylenepropylene copolymers, polybutene, etc.

Polypropylene resins and propylene copolymers are inherently more prone to oxidation than polyethylene resins, and usually require a higher processing temperature than polyethylene resins. Organic phosphites such as trisnonyl phenyl phosphites are conventionally employed in polypropylene, however, previous organic phosphites have not proved wholly satisfactory in preventing colour development during processing or in storage. The phosphorus-containing polymers according to the present invention aid in protecting the colour and the physical properties significantly better than trisnonyl phenyl phosphite the conventional organic phosphite now used in polyethylene and polypropylene.

The phosphorus-containing polymers according to the present invention may be used alone or in combination with other additives such as stabilizers and anti-oxidants such as organic phosphites like trisnonyl phenyl phosphite, alkylated phenols like butylated hydroxy cresol and toluene, aromatic amines, borates, alkylene bisalkylated phenols like methylene bis 2.6 para tertiary butyl cresol, thio bisalkylated phenols, and BB' thio propionic acid esters like dilauryl and distearyl thio dipropionate and the like. The phosphorus-containing polymers according to the present invention may be added, milled into, or dispersed directly in bulk into the material to be stabilized or added to solutions or emulsions of the material. Due to some tendency of the fusible ester polymers to hydrolyze, addition to aqueous emulsions such as SBR latices should be made shortly before precipitation of the elastomer. Typically the phosphorus-containing polymers according to the present invention as stabilizers are added in amounts of from about 0.1 to 5 percent by weight e.g. 0.5 to 2.0 weight percent to the material to be protected.

The following examples are given to illustrate the present invention.

Example 1

A typical curable fusible phosphite polymer was prepared by reacting one mol of trisnonyl phenyl phosphite with 2.7 mols of formaldehyde in a methyl alcohol solution to which was added about one weight percent of oxalic acid based on the reactive phenyl groups. This mixture was refluxed at 70° to 80° C. for about three (3) hours, and then heated to 110° to remove the solvent. The phosphite polymer recovered was a yellow liquid characterized by a specific gravity of 0.98 at 25° C., a phosphorus content of 4.05 to 4.15 percent by weight, no flash point, and soluble in benzene, hexane, acetone and mineral oil. This phosphite polymer was exceptionally resistant to hydrolysis and particularly suitable as a stabilizer additive in SBR emulsions.

An emulsion of this phosphite polymer was triated for hydrolysis after 24 hours at 78° C., and was found to be 0–2 percent hydrolized in comparison to trisnonylphenyl phosphite under similar conditions which was 8–10% hydrolized.

Example 2

Example 1 was repeated employing tristertiary butylphenyl phosphite to obtain a pale yellow solid having a melting point of 50° to 60° C. and containing 6.6 percent by weight phosphorus.

Example 3

Example 1 was repeated employing trisphenyl phosphite to obtain a pale pink solid having a melting point of 60° to 70° C. and containing 10.1 percent by weight of phosphorus.

Example 4

A one (1) liter flask equipped with stirrer, thermometer, water-jacketed condenser and a nitrogen sparge line was charged with 220 grams (1 mol) of nonyl phenol. The nitrogen sparge was turned on, and two grams of an oxalic acid catalyst and 11 grams of paraformaldehyde (91 percent formaldehyde 0.33 mol) added to the nonyl phenol. The temperature of the reaction mixture was then raised from room temperature to 90–100° C. for about 2 hours, and the temperature was then raised to 120° C. for two hours to complete the reaction of a thermoplastic novolak resin. Forty-six grams (0.33 mol) of phosphorus trichloride was then added dropwise to the novolak, while the temperature was maintained at approximately 60° C. The temperature of the reaction mixture was raised to about 90° C. for one hour and then raised to 120° C. for two hours to drive off hydrogen chloride. An alkaline neutralizer comprising three grams of sodium carbonate was added to the reaction mixture, and the reaction mixture stirred for one hour. The reaction product was recovered by filtering at about 100° C. and was a pale yellow viscous liquid phosphite ester characterized by a refractive index of 1.5326, a specific gravity of 1.01–1.02 at 25° C., a viscosity of about 100,000 c.p.s. and a weight percent of phosphorus of 4.08 percent (theoretical 4.47 percent). This ester polymer was soluble in the solvents of the Example 1 polymer. This fusible ester polymer was less resistant to hydrolysis than the phosphite polymer of Example 1, but is an excellent stabilizer for polypropylene resins and ethylene-propylene terpolymers.

Example 5

Example 4 was repeated employing a phenol-formaldehyde resin novalak to obtain an opaque white solid ester polymer having a melting point of about 80 to 90° C.

Example 6

The stabilizing effect of the phosphorus-containing polymers according to the present invention in representative polypropylene resins during processing was determined by mixing polypropylene resin samples with and without stabilizing additives in a Brabender Plastigraph at 200° C. for 30 minutes and then pressing the samples into squares 2″ x 2″ x 1/16″. The samples were then compared for colour development and strength. Typical results are shown in Table 1, employing a polypropylene resin Profax 6513 (a product of the Hercules Powder Co.) having a melt index of about 2.8. This resin has an original translucent white colour. Profax 6513 contains an antioxidant stabilizing system which included about 0.25 weight percent butylated hydroxy toluene, (2,6-ditertiary butyl cresol) (BHT) and 0.25 weight percent of dilaurylthio-di propionate (DLTP). The hindered phenol and dipropionate are added to the resin during polymerization which produces a more stabilized product.

TABLE 1.—EFFECT OF PHOSPHITE POLYMERS AS STABILIZERS IN POLYPROPYLENE DURING PROCESSING

| Polypropylene Sample 6513 with— | Colour after processing |
|---|---|
| (1) No additive | Tan. |
| (2) 0.5 weight percent trisnonylphenyl phosphite | Pale tan. |
| (3) 0.5 weight percent ester polymer according to Example 4 | Light tan. |
| (4) 0.5 weight percent phosphite polymer according to Example 1 | Slight grey tint. |

This data illustrates that the phosphorus-containing polymers according to the present invention are more effective than trisnonylphenyl phosphite in inhibiting colour development of stabilized polypropylene resin during processing.

Example 7

A really effective stabilizer will not only inhibit a degradation of the polypropylene during processing, but will also reduce colour development and strength diminution during storage or heat ageing.

Stabilized Profax 6513 after processing at 200° C. for 15 minutes gradually develops a yellow colour on storage. Trisnonylphenyl phosphite is ineffective in preventing this colour development, while the phosphorus-containing polymers according to the present invention are remarkably more effective. Heat ageing tests were conducted by preparing samples on the Brabender at 200° C. for 15 minutes and then pressing the samples into squares 2″ x 2″ x 1/16″. These squares are then heat aged in an oven at 150° C. for seven days (168 hours) and then observed for colour development and strength. Table II illustrates the results of typical tests of heat ageing on both Profax 6513 and Profax 6501 an essentially unstabilized white propylene resin.

TABLE II.—EFFECT OF PHOSPHITE POLYMER AS STABILIZER IN POLYPROPYLENE ON STORAGE

| Sample | Colour | Strength |
| --- | --- | --- |
| 1. 6513 no additive | Dark brown (after 96 hours). | Crumbles when picked up. |
| 2. 6513—0.5 wt. percent of trisnonylphenyl phosphite. | Dark yellow to brown (after 96 hours). | Crumbles along the edges when picked up. |
| 3. 6513—0.5 wt. percent of phosphite polymer according to Example 1. | Pale yellow | Appears to have original strength. |
| 4. 6513—0.5 wt. percent of ester polymer according to Example 4. | Pale yellow (after 168 hours). | Do. |
| 5. 6501 no additive | Dark brown (after 48 hours). | Crumbles when picked up. |
| 6. 6501—0.5 wt. percent trisnonylphenylphosphite, 0.25 wt. percent DLTP, 0.25 wt. percent BHT. | Dark brown (after 72-96 hours). | Do. |
| 7. 6501—0.5 wt. percent phosphite polymer according to Example 1, 0.25 wt. percent DLTP, 0.25 wt percent BHT. | Yellow | Appears to have original strength. |
| 8. 6501—0.5 wt. percent ester polymer according to Example 4, 0.25 wt. percent DLTP, 0.25 wt. percent BHT. | Light brown | Appears to have original strength. |

As shown above, the phosphorus-containing polymers according to the present invention protect the colour and strength properties of stabilized and unstabilized polypropylene resins to a far greater degree than the conventional organic phosphite trisnonylphenyl phosphite. As shown by the data, the phosphorus-containing polymers are particularly useful in combination with antioxidant additives.

*Example 8*

Samples of the phosphite polymer prepared as in Example 2 and the phosphite polymer of Example 3 were boiled in water and 6 N hydrochloric acid with no change in appearance, melting point or percent phosphorus, indicating their exceptional stability and high resistance to hydrolysis. Samples of 1.25 weight percent of these phosphite resins were incorporated into a hydrocarbon solvent solution of an unstabilized styrene-butadiene latex rubber crumb (SBR). The SBR was then precipitated, and heat aged by placing samples in aluminum foil-lined paper cups and aged at 100° C. for 0, 24 and 48 hours and the samples then examined.

The samples were tested after heat ageing for the percent insoluble in benzene (percent gel), since gel build-up indicates resinification of the polymer and the relative effectiveness of the stabilizer in preventing or inhibiting the degradation of the elastomeric properties of the SBR. The results are shown in Table III.

TABLE III

| Time, hrs. | I Phosphite polymers of Example 2, percent gel formation | II Phosphite polymers of Example 3, percent gel formation | Trisnonyl phenyl phosphite, percent gel formation |
| --- | --- | --- | --- |
| 0 | 0.0 | 2.0 | 0.0 |
| 24 | 2.4 | 19.4 | 42.5 |
| 48 | 18.0 | 38.7 | 66.6 |

In the same series of tests, the air exposed surface of the material containing trisnonylphenyl phosphite was hardened and resinified, while the surface of the materials containing the phosphite polymers remained soft, indicating that the phosphite polymers were also protecting the rubber from oxidative degradation.

*Example 9*

Samples of the phosphite polymers as described in Examples 1 and 2 were also compared with 2,2'-methylene-bis(4-methyl-6-tertiarybutyl phenol), a commercial antioxidant. All samples were incorporated into the polymer at about 2.0 weight percent by milling into a polyester, by adding to a hydrocarbon solution of an ABS resin, and adding to a melted polyethylene. The samples were then heated in a small pan on a hot plate to a molten state for thirty (30) minutes. The colour development of the polymers appeared similar to the original colour. The polymers used were a polyethylene having a melting point of about 90° C., an acrylonitrile-butadiene-styrene (ABS) resin having a softening point of about 205° C. and an isophthalic and tertphthalic-ethylene glycol saturated polyester having a ring and ball softening point of about 140° C. (as described in U.S. Patent 2,965,613).

The phosphorus-containing polymers according to the present invention are normally employed as soluble fusible polymers due to the ease of incorporation into a resin, plastic or elastomer; however, if desired, the phosphorus-containing polymers may be cured wholly or partially in an infusible insoluble product. The infusible phosphorus-containing polymer have a much higher degree of resistance to hydrolysis than the corresponding fusible polymers. The phosphorus-containing polymers may be used alone or in combination with various phosphite polymer and ester polymer combinations or with a variety of additives such as glycols, plasticizers, amines, organic borates, like 2, 6 tertiary butyl-4-methyl borate and other alkyl, phenyl, or alkyl-phenyl borates, metal salt stabilizers, metal oxides, fatty acid soaps, organic phosphites such as trisnonyl phenyl phosphite, alkyl phenol sulfides and the like.

The phosphorus-containing polymers according to the present invention may be used as stabilizers or antioxidants alone or in combination with other additives in gasolene, waxes, greases, natural and synthetic lubricating oils, jet fuel, heating fuel oil, and as a general petroleum product additive as a stabilizer or for its phosphorus content. Additionally the phosphorus-containing polymers may also be employed as tackifiers, as flame retardant or heat resistant resins, as binders such as for grinding wheels, abrasive cloth, or brake and clutch facings, as tire cord adhesives and in other applications.

The aromatic phosphites employed in the present invention may be prepared in the conventional way from the corresponding phenol and a trivalent phosphorus compound, suitably phosphorus trichloride. Thus, for example, trisnonylphosphite may be prepared by the reaction of 1.1 mols of nonyl phenol with 0.33 mol of phosphorus trichloride.

What we claim is:

1. A phosphorus-containing polymer prepared by the reaction of an aryl phosphite unsubstituted in the 2, 4 or 6 position and an aldehydic compound capable of condensing with the aryl phosphite which aldehydic compound is selected from the group consisting of aliphatic and alicyclic aldehydes, the mol ratio of aryl phosphite to aldehyde being between about 0.1 and 2.0.

2. The polymer as claimed in claim 1 wherein the aryl phosphite is a phenyl phosphite and the phosphorus content of the polymer ranges from about 4.0 to 16.0 percent by weight.

3. The phosphorus-containing polymer of claim 1 wherein the aryl phosphite is selected from the group consisting of triphenyl phosphite; alkyl-substituted trisphenyl phosphites, mixed alkyl-phenyl phosphites, mixed alkylene-phenyl phosphites, alkylene-substituted trisphenyl phosphites and combinations thereof.

4. The phosphorus-containing polymer of claim 1 wherein the reaction is carried out in the presence of an acid catalyst.

5. The phosphorus-containing polymer of claim 1 wherein the aldehyde is selected from the group consisting of formaldehyde, paraformaldehyde, furfural, glyoxal and acetaldehyde.

6. The phosphorus-containing polymer of claim 1 wherein the aldehyde is formaldehyde and the aryl phosphite includes a tris $C_4$–$C_{12}$ alkyl-substituted phenyl phosphite.

7. The phosphorus-containing polymer of claim 6 wherein the phosphite is trisnonyl phenyl phosphite.

8. The phosphorus-containing polymer of claim 1 wherein the reaction is carried out under substantially non-aqueous reaction conditions.

9. The phosphorus-containing polymer of claim 8 wherein the reaction is carried out in a non-aqueous organic solvent solution in the presence of an acid catalyst.

10. The phosphorus-containing polymer of claim 1 wherein the mol ratio of aryl phosphite to aldehyde is between about 0.5 and 1.5.

11. The phosphorus-containing polymer of claim 1 wherein less than a stoichiometric amount of aldehyde is employed in the reaction to provide a fusible soluble phosphorus-containing polymer.

12. The phosphorus-containing polymer of claim 1 wherein the polymer contains free hydroxyl groups.

13. A phosphorus-containing polymer prepared by the condensation reaction of a $C_4$–$C_{12}$ alkyl-substituted trisphenyl phosphite, having the phenyl radicals unsubstituted in the 2, 4 or 6 position, with formaldehyde, the mol ratio of phenyl phosphite to formaldehyde being between about 0.1 and 2.0 to provide a fusible soluble phosphorus-containing condensation product.

14. The phosphorus-containing polymer of claim 13 wherein the formaldehyde is paraformaldehyde, the reaction carried out in the presence of an acid catalyst under substantially nonaqueous conditions, and the polymer characterized by a phosphorus content of about 4.0 to 16.0% by weight.

15. The phosphorus-containing polymer of claim 14 wherein the phosphite is trisnonyl phenyl phosphite.

16. The phosphorus-containing polymer prepared as set forth in claim 13 which has been reacted to provide an insoluble thermosetting phosphorus-containing polymer.

17. A polymer composition subject to degradation to which has been added a stabilizing amount of the phosphorus-containing polymer of claim 1.

18. The polymer composition of claim 17 wherein the polymer is selected from the group consisting of: copolymers of styrene and butadiene; copolymers of butadiene and acrylonitrile and butadiene, acrylonitrile and styrene; polybutadiene, butyl rubber; copolymers of styrene and acrylonitrile; natural rubber; copolymers of ethylene and propylene and ethylene, propylene and a diene; $C_2$–$C_4$ olefinic resins; polyvinylchloride, copolymers of vinyl chloride and vinyl acetate; polystyrene; rubber-modified polystyrene; acrylic resins; and iso and terephthalatic acid glycol polyester resins which polymers contain a stabilizing amount of from about 0.1 to 5.0 percent by weight of a phosphorus-containing polymer.

19. The polymer composition of claim 18 wherein the phosphorus-containing polymer employed is prepared by the condensation reaction of a $C_4$–$C_{12}$ alkyl-substituted trisphenyl phosphite, having at least one of the phenyl radicals unsubstituted in the 2, 4 or 6 position, with less than a stoichiometric amount of formaldehyde to provide a fusible soluble phosphorus-containing condensation product.

20. A $C_2$–$C_4$ olefinic resin subject to degradation to which has been added a stabilizing amount of a phosphorus-containing polymer prepared as set forth in claim 13 and which contains a stabilizing amount of an antioxidant comprising an ester of thiodipropionic acid.

21. The resin of claim 20 which includes a stabilizing amount of a hindered phenol.

22. An elastomeric polymer stabilized by the addition of from 0.1 to 5.0 percent by weight of a phosphorus-containing polymer of claim 14 and an organic borate.

23. The polymer of claim 22 wherein the elastomeric polymer is a copolymer of styrene and butadiene, and the organic borate is selected from the group of alkyl, phenyl and alkylphenyl borates.

References Cited

UNITED STATES PATENTS

| 3,112,286 | 11/1963 | Morris et al. | 260—45.7 |
| 3,114,419 | 8/1964 | Guttag | 260—59 |
| 3,183,214 | 5/1965 | Welch et al. | 260—921 |
| 3,297,631 | 1/1967 | Bown et al. | 260—45.95 |

OTHER REFERENCES

Martin, "The Chemistry of Phenolic Resins," N.Y., Wiley and Sons, 1956, pp. 51–57.

MURRAY TILLMAN, *Primary Examiner.*

GEORGE F. LESMES, *Examiner.*

J. C. BLEUTGE, *Assistant Examiner.*